United States Patent [19] [11] 4,211,887
Williamson [45] Jul. 8, 1980

[54] ELECTRICAL FURNACE, ZONES BALANCED WITH A SYMMETRICALLY TAPPED TRANSFORMER

[75] Inventor: Michael Williamson, Newark, Ohio

[73] Assignee: Owens-Corning Fiberglas Corporation, Toledo, Ohio

[21] Appl. No.: 954,492

[22] Filed: Oct. 25, 1978

[51] Int. Cl.[2] .......... C03B 5/02; H05B 3/60
[52] U.S. Cl. .......... 13/6
[58] Field of Search .......... 13/6, 23

[56] References Cited

U.S. PATENT DOCUMENTS

| | | | |
|---|---|---|---|
| 2,993,079 | 7/1961 | Augsburger | 13/6 |
| 3,145,246 | 8/1964 | Augsburger | 13/6 |
| 3,147,328 | 9/1964 | de Bussy | 13/6 |
| 3,852,509 | 12/1974 | Rutledge et al. | 13/6 |
| 3,967,046 | 6/1976 | Froberg et al. | 13/6 |
| 4,025,713 | 5/1977 | Suesser | 13/6 |
| 4,049,899 | 9/1977 | Shimizu | 13/6 |

*Primary Examiner*—Roy N. Envall, Jr.
*Attorney, Agent, or Firm*—Ronald C. Hudgens; Charles F. Schroeder; Paul T. Kashimba

[57] ABSTRACT

A glass melting furnace is divided into a number of heating zones. Each of the heating zones is connected to a common transformer output but is symmetrically tapped to the secondary of the transformer with respect to each of the other zones. In this way, the heating effect in the different zones can be balanced with each other. With a single transformer output, it is possible to introduce heating variances along the length of a flow channel or to produce voltage variations across different zones wherein the electrodes of each respective zone are of different spacing. Heat can be evenly developed along the length of the flow channel or in irregular spaces, such as corners or turns in the flow channel.

17 Claims, 4 Drawing Figures

ELECTRICAL FURNACE, ZONES BALANCED WITH A SYMMETRICALLY TAPPED TRANSFORMER

FIELD OF THE INVENTION

This invention relates to the field of melting furnaces and particularly electrical furnaces and more particularly to glass melting furnaces.

BACKGROUND OF THE PRIOR ART

The prior art shows a number of attempts to balance the power introduced between opposed electrodes in a furnace. Many of the prior art attempts used transformers tapped along the length of the secondary with multiple separate taps. These taps provided more or less voltage with respect to each of the other taps.

Some of the prior art examples are shown in U.S. Pat. Nos. 3,852,509, 4,025,713, 3,145,246, 3,147,328 and 2,993,079.

The prior art shows tapped transformers but does not show the use of a transformer secondary providing symmetrical taps and where the voltage magnitude vector corresponds to the distances between the respective electrodes or to the location of the electrodes with respect to the relative distance of the electrodes along the flow channel.

SUMMARY OF THE INVENTION

In this invention, a transformer is provided with a multiple tapped secondary with respect to the center of the transformer. The symmetrical tap closest to the center of the transformer naturally has the lowest voltage. Those symmetrical taps having their taps located on the transformer secondary further away from the center have the larger voltages.

The symmetrically tapped transformer secondary is then capable of producing a number of separate voltages of varying magnitudes, but with the same phase and with each of the voltages produced having symmetrical wave forms with respect to each of the other voltages from the other symmetrical taps.

In a first application, and where it is desired to maintain an even heat along the length of a flow channel as in the forehearth and where the cooling effect increases further along the flow channel away from the melting portion of the furnace, it is necessary to provide a higher voltage along the electrodes furthest away from the flow channel entrance adjacent the furnace. In this regard, the higher voltage from the symmetrically tapped transformer are supplied to those electrodes furthest away from the entrance of the flow channel and closest to the output port, while the voltages having a lesser magnitude are applied to the electrodes of those zones closer to the furnace and further away from the outlet port.

In a second application, where there is a bend in the flow channel or where the furnace or the flow channel has two intersecting walls or in a corner or alcove of the furnace, the electrodes are placed across the walls forming zones and the electrodes of different zones are spaced at varying distances with respect to the distances of the electrodes of each of the other zones, and it is desirable to selectively apply symmetrically tapped voltages. In this case, the electrode pairs forming a first zone can be more closely spaced than any of the electrode pairs in any of the other zones and are connected to the lowest voltage output of the symmetrically tapped transformer. Those electrode pairs forming other zones, and where the distances between the electrode pairs are further apart, are connected to the higher voltages of the symmetrically tapped transformer output. In this regard the distances between electrodes of respective zones correspond substantially to the relative size of the voltage magnitude vectors applied to the respective zones.

In this way, where the electrodes are placed in a bend or corner so that the proposed electrodes of each zone are placed with varying distances therebetween, the voltages applied to these electrodes are regulated in accordance and corresponding to the distances between the electrodes to regulate the heat flow throughout the zone.

For example, the voltage magnitudes applied to a first set of electrodes in a first zone, wherein the electrodes are closer together than all the other electrodes, would have a smaller vector magnitude than the voltages applied to the other zones having electrodes placed further apart, and relative voltage vector magnitudes would correspond to the distances between the corresponding electrodes, as stated above.

DESCRIPTION OF THE PREFERRED EMBODIMENTS

Figure 1A:
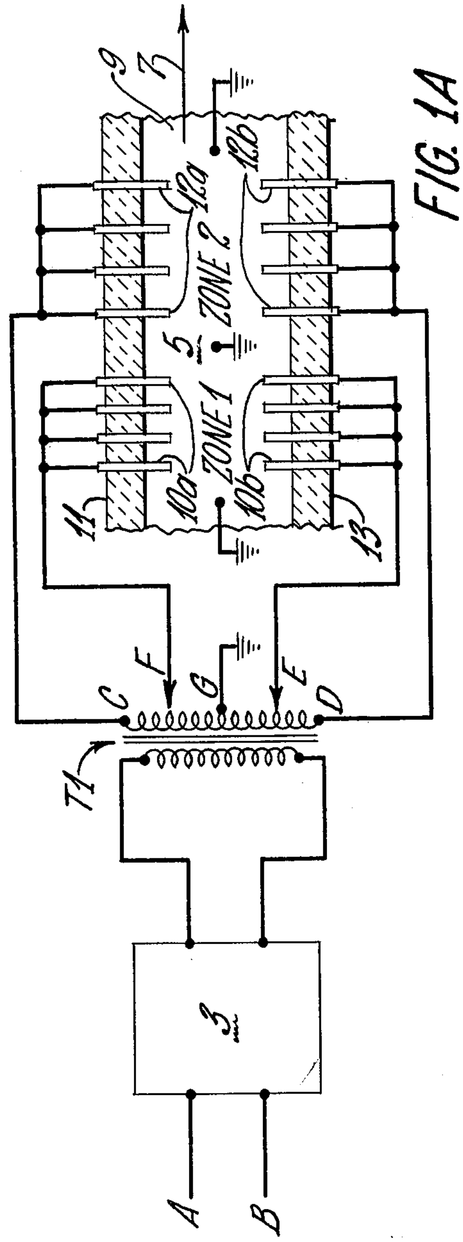
FIG. 1A shows the arrangement of the symmetrically tapped transformer with zones of electrodes placed along the flow channel of a melting furnace such as in the forehearth.
Figure 1B:
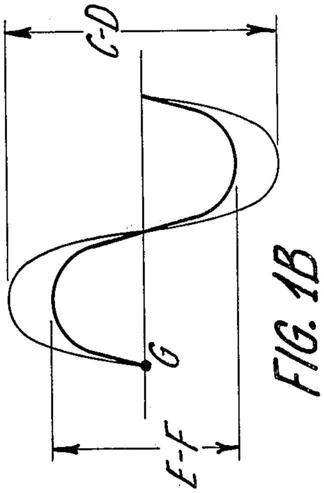
FIG. 1B shows the relative voltage magnitude wave forms at the output of secondary of the transformer T1 of FIG. 1 and FIG. 2.

Referring now to FIGS. 1A and 1B, a first embodiment of this invention is shown. In that embodiment, a transformer T1 is shown as having an input A-B connected to a regulating circuit 3 of a conventional type and the primary of transformer T1. The secondary of the transformer T1 is shown as having a center tap G which is shown as grounded, but is not necessary for the practice of this invention and a first symmetrical tap F-E with respect to the center tap G and a second symmetrical tap C-D with respect to the first symmetrical tap E-F and the center tap G. A section of a furnace flow channel or forehearth is shown at 5. The direction of flow is shown by the arrow 7. The outward port is shown at 9.

As shown in FIG. 1A, the channel may be grounded along a center line and in that regard tied to the center tap G of the transformer secondary.

However, the flow channel need not be grounded and this invention may be practiced with a non-grounded secondary center tap and a non-grounded flow channel or just the secondary of the transformer may be grounded or just the center of the flow channel may be grounded depending upon the particular results desired in the use of this invention.

A first zone is shown having opposed electrodes 10*a* and 10*b* disposed on opposite furnace walls 11 and 13, respectively. A second set of electrodes 12*a* and 12*b* disposed on the smae said opposite furnace walls 11 and 13 is also shown.

The second zone comprising the electrodes 12*a* and 12*b* is displaced further along the channel with respect to the flow of the material than the opposed electrodes 10*a* and 10*b* of Zone 1.

As is well known in the melting art, the heat loss is greater further along the length of the flow channel than closer to the entrance port of the material from the furnace.

The voltage at the output of the transformer secondary of T1 is shown in FIG. 1B, with the voltage magnitude across the symmetrical tap C-D being greater than voltage across the symmetrical center E-F, but with both voltages being symmetrical with respect to the center tap G.

The output secondary of transformer T1 is used to apply voltages of different vector maginitudes along the different zones of the furnace. As shown in FIG. 1A, the larger magnitude voltage C-D is applied to the electrodes 12*a* and 12*b* of Zone 2, further along the furnace where a greater energy input is desired to maintain the heating effect and to compensate for the increased cooling effect. The lesser voltage magnitude from symmetrical center tap E-F is applied to the opposed electrodes 10*a* and 10*b* in zone 1 closest to the entrance port to the flow channel and where the heat cooling effect is less.

The symmetrical center taps are used to maintain the voltage difference at a minimum between adjacent electrodes of different zones.

The result is that the interzone current paths between electrodes 10*a* and 10*b* and electrodes 12*a* and 12*b* are minimal as the voltage difference is limited to that voltage difference between the taps of the secondary of the transformer. The stray leakage currents between the adjacent electrodes of each zone on opposite furnace walls 11 and 13 are maintained substantially constant since the voltage difference between the symmetrical taps on each side of the secondary of transformer T1 (between C and F and between E and D) are the same.

In this way the symmetrically tapped transformer may be used to control voltages and leakage paths in the different parts of the furnace and between different zones.

Additionally, the potential along the center of the flow path is substantially close to the center tap potential of the transformer, relative to the resistance of the material and the current may be made to flow from the center of the flow channel to the center tap of the transformer, where desirable.

Where it is desired to maintain the potential at the center of the flow channel at ground potential, the effect may be better achieved by positively grounding the center channel and positively grounding the center tap and typing that ground back to the center tap of the transformer. In this way, the voltage at the orifice and along the center path of the flow channel can be maintained at ground potential.

Although FIG. 1A shows a flow channel within a furnace, along which a material such as melted glass is flowing in the direction of arrow 7, the use of the electrodes can also be within a furnace and without relation to any definite flow path but where it is advantageous to apply voltages of different vector magnitudes to different zone electrodes.

Such a case would be in a corner or in an alcove of a furnace although it can be used generally anywhere within the furnace.

Figure 2:
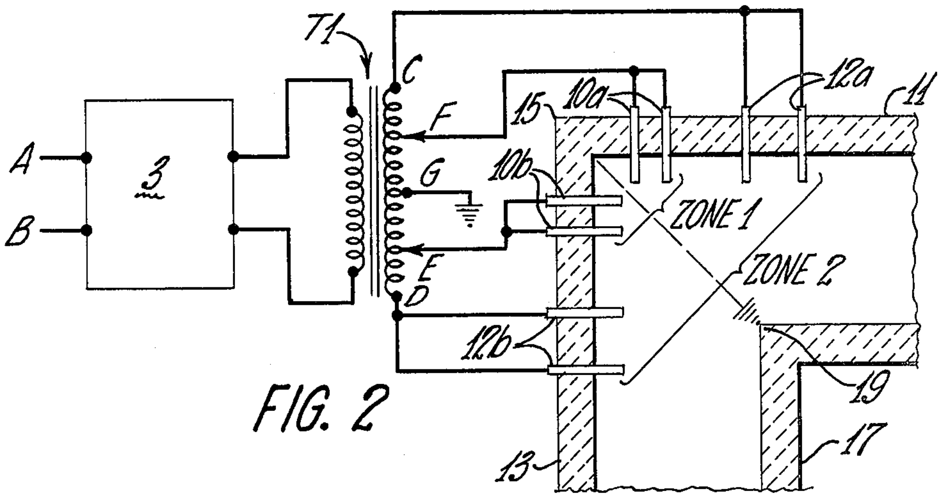
FIG. 2 shows the symmetrically tapped transformer according to the principles of the invention connected to electrodes spaced around the turn or in a corner of a furnace or forehearth or flow channel.

Referring now to FIG. 2, this invention is shown in a corner or alcove of a furnace or flow channel.

As in the case of FIG. 1A the same numbers were used to show similiarly operated parts.

As shown, the electrodes 10*a* and 10*b* form a first zone and electrodes 12*a* and 12*b* form a second zone.

As in the nature of an alcove or corner having two intersecting walls 11 and 13, it is not possible to place the opposed electrodes 10*a* and 10*b* of Zone 1 at the same spacing as the opposed spacing of electrodes 12*a* and 12*b* of Zone 2. The practical constraints of the furnace require that the opposed electrodes in Zone 1 be placed closest together as they are closest to the intersecting wall 15 of the furnace, and the second electrode pair 12*a* and 12*b* of Zone 2 be more widely spaced as they are further away from the intersecting wall 15 of the furnace.

Figure 3:
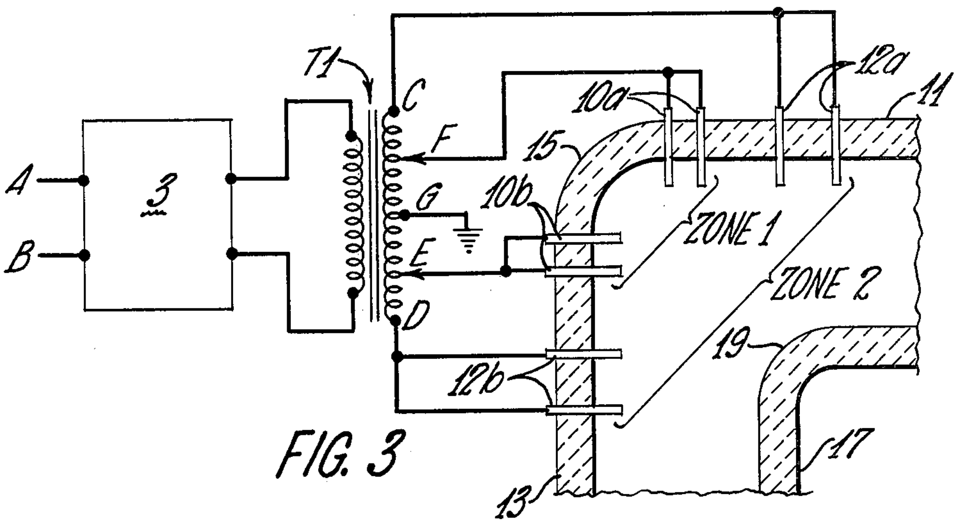
FIG. 3 shows the symmetrically tapped transformer according to the principles of the invention connected to electrodes spaced around a bend on a flow channel such as a forehearth.

As can be envisioned, the intersecting walls 11 and 13 may not necessarily have a corner as 15, but may be arranged in a form of a circular bend as shown in FIG. 3, and may not necessarily be a corner or alcove of a furnace, but may represent the one wall of a turn or bend in a flow channel of a furnace or in the forehearth.

The relationship of the voltage magnitudes from the secondary of the transformer T1 is the same as shown in FIG. 1B and is not repeated.

As can be seen in FIG. 2, the electrodes 10*a* and 10*b* of Zone 1 are closer together and require less voltage to maintain a suitable current for the desired heat in the area of Zone 1.

However, Zone 2, having electrodes further apart, has a higher resistance and requires a greater voltage to produce the necessary current to maintain the same heat as in Zone 1.

Therefore, in order to balance the heat within Zone 1 and Zone 2 and to maintain the heat constant throughout Zone 1 and Zone 2, it is necessary to use the symmetrically tapped transformer T1 which provides voltages having vector magnitudes corresponding to the distance between electrodes of each of the corresponding zones. Alternately, of course, the output of symmetrically tapped transformer can varied to produce greater or lesser heating effects in one zone relative to a second zone.

As shown in FIG. 2, the center tap G is grounded, although this is not necessary to the practice of the invention and, as in the case of FIG. 1, the furnace can be grounded along a center line through Zone 1 and Zone 2 as shown by the dashed lines. However, this is not necessary to the practice of the invention to achieve the balanced heat distribution between the zones and to maintain minimal interzone voltage between adjacent electrodes of adjacent zones to minimize interzone current paths.

As in the case of FIG. 1A the interzone currents between adjacent electrodes 10*a* and 10*b* and 12*a* and 12*b* are minimized because of the minimal voltage between point C-F and E-D at the output of the transformer T1, and are maintained substantially consistent with each other because of the nature of the symmetrically tapped secondary transformer producing equal voltage differences C-F and E-D.

Referring now to FIG. 3, the application of this invention is shown in a flow channel such as in the forehearth of a glass furnace, but where the walls have a curve or radius bend rather than intersecting in a corner as shown in FIG. 2.

In FIG. 3, the same numbers are used to show the same or similar parts as in FIG. 2.

In this regard, FIG. 3 is shown as having a bend 15 at turn in the flow path rather than at an intersecting corner. It is recognized, though, that FIG. 2 may describe the outside wall of a channel or flow path, as well as the corner or alcove of a furnace, and wherein the flow channel or outside wall has a circular or angular bend as shown in FIG. 3.

In this regard, an opposite wall 17 of the channel has an inner radius bend 19 as shown in FIG. 3.

Referring back to FIG. 2, the embodiment of FIG. 2 may also be thought of as a flow channel having opposed walls, merely by putting a second wall 17 having an opposed corner 19 opposite the corner 15 (shown in phantom).

The operation of the electrode banks contacted to taps E-F and C-D as shown in FIG. 3 is the same as shown in FIG. 2.

In this regard, electrode banks 10*a* and 10*b* of Zone 1 are connected to symmetrical tap E-F of output of the transformer T1 and electrodes 12*a* and 12*b* of Zone 2 are connected to symmetrical tap C-D of the transformer T1.

As in FIG. 2, the heat may be balanced and maintained constant through Zone 1 and Zone 2 by maintaining voltage vectors at the respective electrode paths of each zone consistent with the displacement of the electrodes from each other.

For example, the voltage vectors may be relative to each other as are the distances between the electrodes in Zone 1 and Zone 2 with the voltages applied to electrodes 10*a* and 10*b* being smaller than the voltage applied to electrodes 12*a* and 12*b*, as in the case of FIG. 2.

However, if it is desired, the voltages may be varied to be more or less to produce uneven heating effects in the flow channel.

As would be obvious to one skilled in the art, additional electrodes can be added to increase the zones, adding commensurable additional symmetrical taps to the transformer.

As in the case of FIG. 2 and FIG. 1A the channel can be grounded along the center line through Zone 1 and Zone 2 and the center tap G of the transformer can be grounded. On the other hand, the grounds can be deleted, and center tap of the transformer T1 can be floating. If it is desired to maintain any portion of the channel at zero potential or at the same potential as the center tap of the transformer, then the appropriate connections can be made as described above.

It can be seen that this invention introduces multiple zones in the furnace without the need for separate power supplies or transformers to supply each zone.

Additionally, the symmetrically tapped transformer may be used to control the interzone voltage and undesirable interzone firing, reducing these undesirable firing paths to a minimum and maintaining these undesirable paths where they exist to corresponding levels between adjacent electrodes of each zone.

Additionally, the symmetrically tapped transformer may be used to apply voltages in different zones of a furnace or flow channel while maintaining a center line in the zones or along the flow channel or at the orifice at ground potential or at the potential of the center tap.

By applying voltages from the output of the symmetrically tapped transformer to the electrodes spaced differently throughout the furnace or flow channel zone, it is also possible to regulate the heating effect to maintain a constant heat throughout the several zones.

This description is illustrated restrictive of the principles of the invention and should not be thought of as limiting the invention to the specific embodiments shown above.

I claim:

1. A furnace having a plurality of zones for melting and heating of material, said zones each having at least a pair of electrodes for creating a respective current path therebetween, said electrodes in each said zone being supplied by a common transformer secondary and wherein each of said electrode paths of said zones are symmetrically tapped from said transformer secondary with respect to each other.

2. The furnace in claim 1 wherein the spacing between the first electrode pair is less than the spacing between the second of said electrode pairs.

3. The furnace of claim 1 wherein said first electrode pair is tapped to a lower voltage than said second electrode pair.

4. The furnace of claim 3 wherein the said first and second electrode pairs are disposed along the flow path of the furnace with the second electrode pair being in a second zone of said furnace and said first electrode pair being in a first zone of said furnace, said second electrode pair being downstream of said first electrode pair relative to the direction of flow of the said furnace.

5. The furnace of claim 4 wherein said furnace is a glass melting furnace.

6. The furnace of claim 5 wherein the said first and second electrode pairs have their respective electrodes displaced on opposite sides of a flow channel and substantially equally spaced from the center of the flow channel.

7. The furnace of claim 5 wherein an orifice is disposed in the said flow path and substantially cenetred in the flow path.

8. The furnace of claim 7 wherein said orifice is substantially at ground potential.

9. The furnace of claim 1 or 7 wherein said transformer secondary center is at ground potential.

10. The furnace of claim 4 or 6 wherein said electrode pair of said second zone is at a higher potential than said electrode pair of said first zone.

11. The furnace of claim 2 wherein said first electrode pair is tapped to a lower voltage than said second electrode pair.

12. The furnace of claim 3 wherein said first and second zone are located along the length of a flow path and along a bend in said flow path.

13. The furnace of claim 3 wherein each said opposite electrode of each of said first and second electrode pairs are located on respective intersecting walls of said furnace.

14. The furnace of claims 12 or 13 wherein a said electrode pair of said first zone are located between the said electrode pair of said second zone.

15. The furnace of claim 1, 2, 3, 4, 11, or 12 wherein the temperatures in the said second and first zones are substantially equal.

16. The furnace of claim 13 wherein the said intersecting walls form a corner of said furnace.

17. The furnace of claim 13 wherein said intersecting walls form an alcove in said furnace.

* * * * *